United States Patent
Nishimura et al.

(10) Patent No.: US 12,276,990 B2
(45) Date of Patent: Apr. 15, 2025

(54) TEMPERATURE ADJUSTMENT DEVICE

(71) Applicant: NIPPON THERMOSTAT CO., LTD., Kiyose (JP)

(72) Inventors: Tetsuya Nishimura, Kiyose (JP); Masayuki Numata, Kiyose (JP)

(73) Assignee: NIPPON THERMOSTAT CO., LTD., Kiyose (JP)

( * ) Notice: Subject to any disclaimer, the term of this patent is extended or adjusted under 35 U.S.C. 154(b) by 0 days.

(21) Appl. No.: 18/289,190

(22) PCT Filed: Apr. 12, 2022

(86) PCT No.: PCT/JP2022/017598
§ 371 (c)(1),
(2) Date: Nov. 1, 2023

(87) PCT Pub. No.: WO2022/239592
PCT Pub. Date: Nov. 17, 2022

(65) Prior Publication Data
US 2024/0219939 A1 Jul. 4, 2024

(30) Foreign Application Priority Data

May 14, 2021 (JP) ................................ 2021-082649

(51) Int. Cl.
*G05D 23/02* (2006.01)
*F01P 7/14* (2006.01)
*F01P 7/16* (2006.01)

(52) U.S. Cl.
CPC .............. *G05D 23/022* (2013.01); *F01P 7/16* (2013.01); *F01P 2007/146* (2013.01)

(58) Field of Classification Search
CPC .... G05D 23/022; F01P 7/16; F01P 2007/146; F01P 7/167
See application file for complete search history.

(56) References Cited

U.S. PATENT DOCUMENTS 4,349,806 A * 9/1982 Boulanger ............. H01H 37/54
                                                    200/290
5,855,069 A   1/1999 Matsubayashi et al.
(Continued)

FOREIGN PATENT DOCUMENTS

CN      112096504 A  * 12/2020  ................ F01P 7/16
JP    H09-303354 A    11/1997
(Continued)

OTHER PUBLICATIONS

Machine Translation of JP 3740035 B2 Pdf File Name: "JP3740035B2_Machine_Translation.pdf" (Year: 2006).*
(Continued)

*Primary Examiner* — Grant Moubry
*Assistant Examiner* — Ruben Picon-Feliciano
(74) *Attorney, Agent, or Firm* — HAUPTMAN HAM, LLP

(57) ABSTRACT

A temperature adjustment device is capable of suppressing sleeve enlargement and preventing the rattling thereof with a synthetic resin housing. Flanges are formed on the temperature adjustment member. The sleeve has a groove along the circumferential direction on its outer periphery and a lateral hole opening at one end to the groove and penetrating through the wall thickness of the sleeve. A clip member has an outer fitting portion, elastically deformable and fittable to the groove and has an inward convex portion holding the flange from the distal-end side of the sleeve, by being inserted in the lateral hole. The groove wall has a groove-depth wall at the deepest portion opposite to the groove opening and a distal-proximal-end-side curved portion of the groove-depth wall connected to the distal-proximal-end side of the sleeve. The radius of curvature of the distal-end-side curved portion is larger than that of the proximal-end-side curved portion.

9 Claims, 13 Drawing Sheets

(56) References Cited

U.S. PATENT DOCUMENTS

| | | | | |
|---|---|---|---|---|
| 8,893,979 | B2* | 11/2014 | Kusakabe | G05D 23/022 |
| | | | | 236/100 |
| 2003/0050148 | A1 | 3/2003 | Nishii et al. | |
| 2004/0163612 | A1* | 8/2004 | Takahashi | G05D 23/30 |
| | | | | 123/41.1 |
| 2011/0130232 | A1 | 6/2011 | Barrette et al. | |
| 2011/0214626 | A1* | 9/2011 | Watanabe | F01P 7/167 |
| | | | | 123/41.1 |
| 2012/0025938 | A1 | 2/2012 | Adler et al. | |
| 2013/0334328 | A1* | 12/2013 | Iwamuro | G05D 23/1852 |
| | | | | 236/99 K |
| 2016/0090897 | A1 | 3/2016 | Looser et al. | |

FOREIGN PATENT DOCUMENTS

| | | | | |
|---|---|---|---|---|
| JP | H10-239332 | A | 9/1998 | |
| JP | 2003-028256 | A | 1/2003 | |
| JP | 3740035 | B2* | 1/2006 | F01P 7/16 |
| JP | 2008-008395 | A | 1/2008 | |
| JP | 2010-048142 | A | 3/2010 | |
| JP | 2011-179480 | A | 9/2011 | |
| JP | 2012-507164 | A | 3/2012 | |

OTHER PUBLICATIONS

Machine Translation of CN 112096504 A Pdf File Name: "CN112096504A_Machine_Translation.pdf" (Year: 2020).*
PCT/ISA/210, "International Search Report for PCT International Application No. PCT/JP2022/017598," Jul. 12, 2022.

* cited by examiner

TEMPERATURE ADJUSTMENT DEVICE

RELATED APPLICATIONS

The present application is National Phase of International Application No. PCT/JP2022/017598 filed Apr. 12, 2022, and claims priority from Japanese Application No. 2021-082649, filed May 14, 2021, the disclosure of which is hereby incorporated by reference herein in its entirety.

TECHNICAL FIELD

This invention relates to a temperature adjustment device provided with a temperature adjustment member having a heating section or temperature sensing unit.

BACKGROUND ART

A thermostat device that controls the coolant temperature, disposed in a cooling circuit of an engine (an internal combustion engine), for example, is known as a temperature adjustment device. In some thermostat devices, an accessory part such as a plug is attached using a clipping member, for example, to a sleeve provided on the housing of the thermostat device, as disclosed in patent literature 1.

CITATION LIST

Patent Literature

PTL 1: JP-A-2010-048142

SUMMARY OF INVENTION

Technical Problem

In a case where the accessory part is a temperature adjustment member such as a heater or a temperature sensor that requires energizing, vibration causes wearing at electrical connections to have a contact failure (energizing failure) occur when rattling occurs in the temperature adjustment member. Thus, the temperature adjustment member needs to be firmly fixed to the housing without rattling. However, when the temperature adjustment member is firmly fixed with a clip member to a housing made of synthetic resin, for example, there may be a risk of rattling in the temperature adjustment member due to creep deformation of the housing, and a contact failure occurs.

More in detail, a thermostat device 70 shown in FIGS. 11 and 12, for example, is provided with a heater 55 as a temperature adjustment member, and the heater 55 is fixed by a clip member 60 to a sleeve 51 of a housing 50. As shown in FIGS. 14 and 15, a groove 52 in a U-shape in plan view is formed opening sideward along the circumferential direction at the outer periphery of the sleeve 51, and step 51a is formed on the inner periphery of the sleeve 51. Further, on the sleeve 51, a lateral hole 53 penetrating from the inside of the groove 52 to the upper side in the figure of the step 51a is formed. Meanwhile, a brim portion 55a1 protruding outward is formed on the attaching portion of a heater 55, and the brim portion 55a1 is configured to ride on the step 51a. (See FIG. 15)

As shown in FIG. 13, the clip member 60 has an outer fitting portion 60a having a U-shape in plan view and inward convex portions 60b facing each other extending from both ends of the outer fitting portion. As shown in FIGS. 15 and 16, the clip member 60 presses the brim portion 55a1 of the heater 55 from the upper side in FIG. 15, by fitting the outer fitting portion 60a into the groove 52 and inserting the inward convex portions 60b through the lateral hole 53 into the sleeve 51. Since the translation of the clip member 60 upward in the figure is stopped by the upper side wall in the figure of the groove 52, the heater 55 is prevented from coming off.

In a case where the heater 55 is firmly fixed to the housing 50, as described above, a force in a direction to push up from the clip member 60 side is applied to the upper wall of the groove 52 upper side in FIG. 16. When creep deformation of the groove 52 to open upward and downward in FIG. 16 by the continuous application of the force causes rattling on the heater 55. For inhibiting such deformation of the groove 52, stress relief is desirable by enlarging the radius of curvature R of the curved portions 52a and 52b that continue to the groove-depth wall 52c located at the deep-most portion of the groove 52. However, when the radii of curvature R of the curved portions 52a and 52b are sufficiently enlarged, the vertical width of the groove 52 becomes larger causing the sleeve 51 to increase in size; accordingly, the thermostat device 70 (temperature adjustment device) will be upsized.

The present invention is made, focusing on the above points, and has an object to provide a temperature adjustment device that allows for suppressing the enlargement of the sleeve and inhibiting the occurrence of the rattling of the temperature adjustment member, even when the housing is made of synthetic resin.

Solution to Problem

To solve the above problems, the temperature adjustment device according to the present invention includes a housing having a cylindrical sleeve, a temperature adjustment member having a heating section or temperature sensing unit which is inserted from the sleeve into the housing, and a clip member that fixes the temperature adjustment member to the sleeve, wherein a brim portion protruding outward is formed on the temperature adjustment member, the sleeve is provided with a groove formed on the outer periphery along the circumferential direction and a lateral hole whose one end is opened in the groove and that penetrates the thickness of the sleeve, the clip member includes an outer fitting portion elastically deformable and fittable to the groove and inward convex portions extending facing to each other from both ends of the outer fitting portion and pressing the brim portion from the distal-end side of the sleeve by being inserted through the lateral hole, the wall of the groove includes a groove-depth wall located at the deep-most portion of the groove opposite to the opening of the groove, a distal-end-side curved portion continuous to the distal-end side of the sleeve of the groove-depth wall, and a proximal-end-side curved portion continuous to the proximal-end side of the sleeve of the groove-depth wall, and the radius of curvature of the distal-end-side curved portion is greater than the radius of curvature of the proximal-end-side curved portion.

Since the radius of curvature of the distal-end-side curved portion continuous to the groove-depth wall and that of the proximal-end-side curved portion are different, the above constitution allows for inhibiting the sleeve from increasing in size due to the widened groove and inhibiting the temperature adjustment device from increasing in size. Further, since the above constitution allows to increase in the radius of curvature of the distal-end-side curved portion located at the distal end of the sleeve, inhibiting the deformation to be widened under the force from the clip member side and inhibiting the rattling of the temperature adjustment member can be achieved, even when the housing is made of synthetic resin.

The outer fitting portion of the clip member may be made of wire material and the value of the radius of curvature of the distal-end-side curved portion may be equal to or less than the diameter of the wire material and more than a value of ½ of the wire diameter. When doing so, the outer fitting portion of the clip member can be inserted deeply into the groove when the housing is made of a synthetic resin material that is deformable elastically and the stress generated at the distal-end-side curved portion can be reduced.

The outer fitting portion may be made of wire material and the value of the radius of curvature of the distal-end-side curved portion may be equal to or less than a value of ½ of the wire diameter. When doing so, the outer fitting portion of the clip member can be inserted deeply into the groove when the housing is made of a synthetic resin material that is not easily deformable elastically Further, ribs protruding inward radially may be provided at different positions in the circumferential direction at the inner periphery of the sleeve or the outer periphery of the temperature adjustment member, and the temperature adjustment member may be press-fitted into the sleeve. With this structure, the motion of the temperature adjustment member due to an external force such as vibration is inhibited and the rattling of the temperature adjustment member is more surely inhibited.

A thermostat device is provided, in the housing, with a flow passage for a coolant formed, a valve body for opening and closing the flow passage, a thermo-element driving the valve body to open and close by extension and retraction depending on the temperature of the coolant, and a biasing member that biases the valve body to the closing direction, wherein the thermo-element includes a temperature-sensitive case incorporating a temperature-sensitive member whose volume changes depending on the temperature, a piston whose one end is supported by the housing and extends and retracts to the temperature-sensitive case depending on the volume change of the temperature-sensitive member, and the temperature adjustment member includes a heating section and the heating section may be inserted in the piston.

In a case where the temperature adjustment device is the thermostat device provided with the thermo-element and the heating section of the temperature adjustment member is inserted in the piston, the temperature adjustment member needs to be firmly fixed only by the clip member to the housing without rattling. Thus, in such a case, the application of the present invention to the temperature adjustment device is particularly effective because the widening of the groove due to deformation is directly connected to the occurrence of the rattling of the temperature adjustment member.

The temperature adjustment member may be a temperature sensor having a temperature sensing unit. In that case, the increase in the size of the sleeve is inhibited and the occurrence of the rattling of the temperature sensor is also inhibited, even when the housing to which the temperature sensor is attached is made of synthetic resin.

Advantageous Effects of Invention

With the temperature adjustment device according to the present invention, the increase in the size of the sleeve is inhibited and the occurrence of the rattling of the temperature adjustment member is also inhibited, even when the housing is made of synthetic resin.

DESCRIPTION OF EMBODIMENTS

The temperature adjustment device according to the present embodiment will be described based on the drawings. In each embodiment, the temperature adjustment device is a thermostat device that is provided in a cooling circuit of an engine (an internal combustion engine) and controls the temperature of the coolant.

Figure 1:
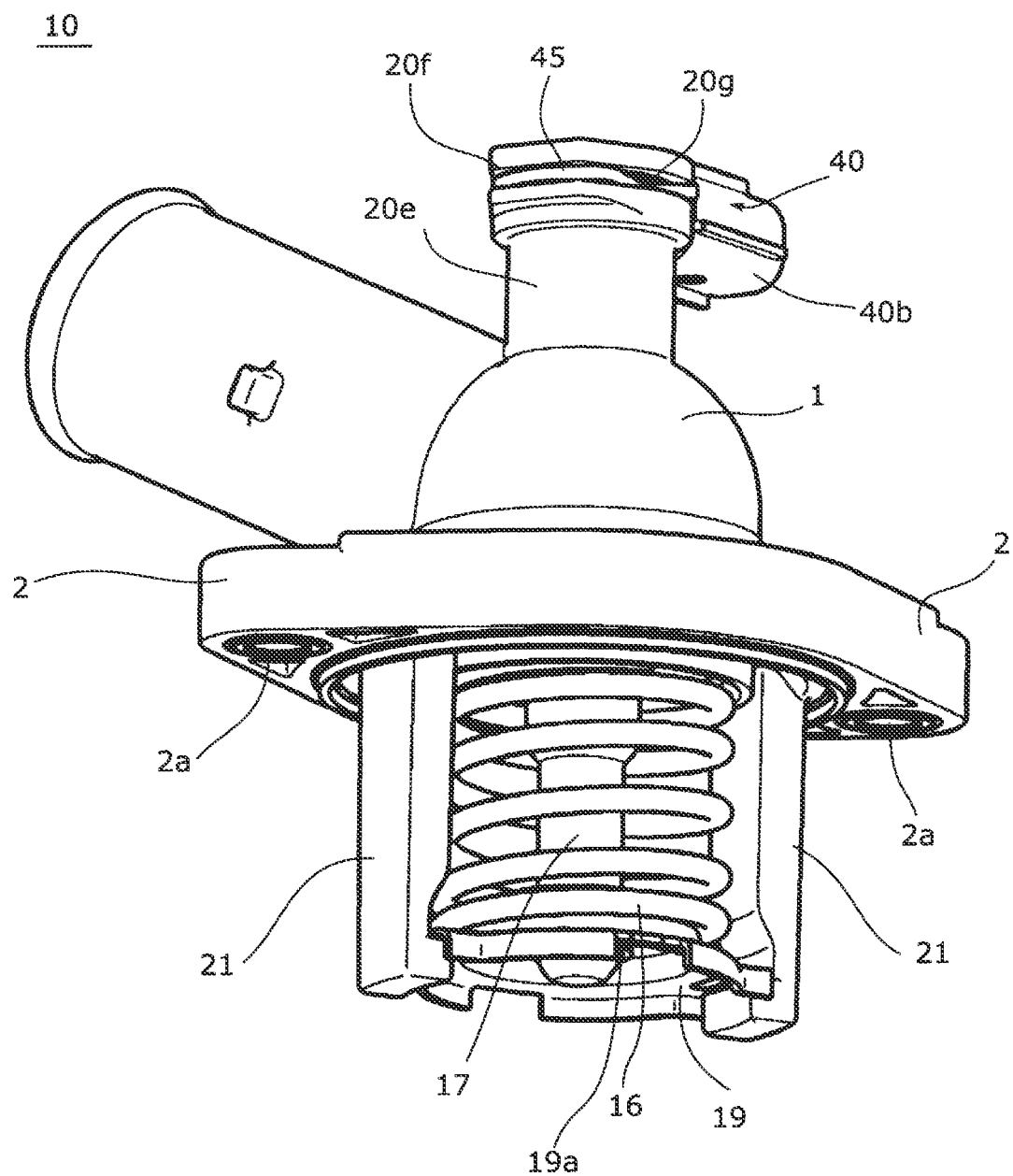
FIG. 1 is a perspective view of a thermostat device as a temperature adjustment device according to a first embodiment.
Figure 2:
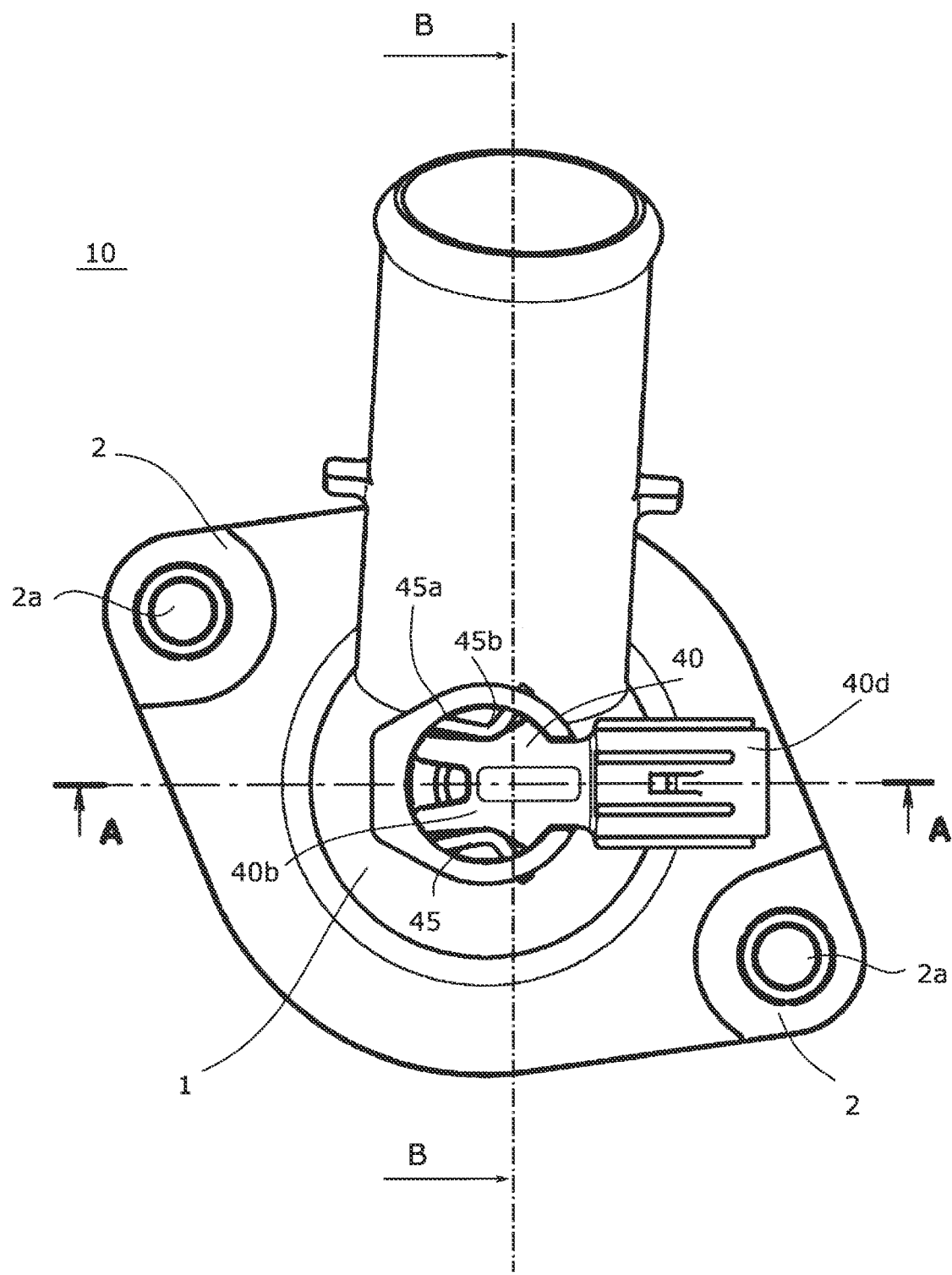
FIG. 2 is a plan view of the thermostat device in FIG. 1.
Figure 3:
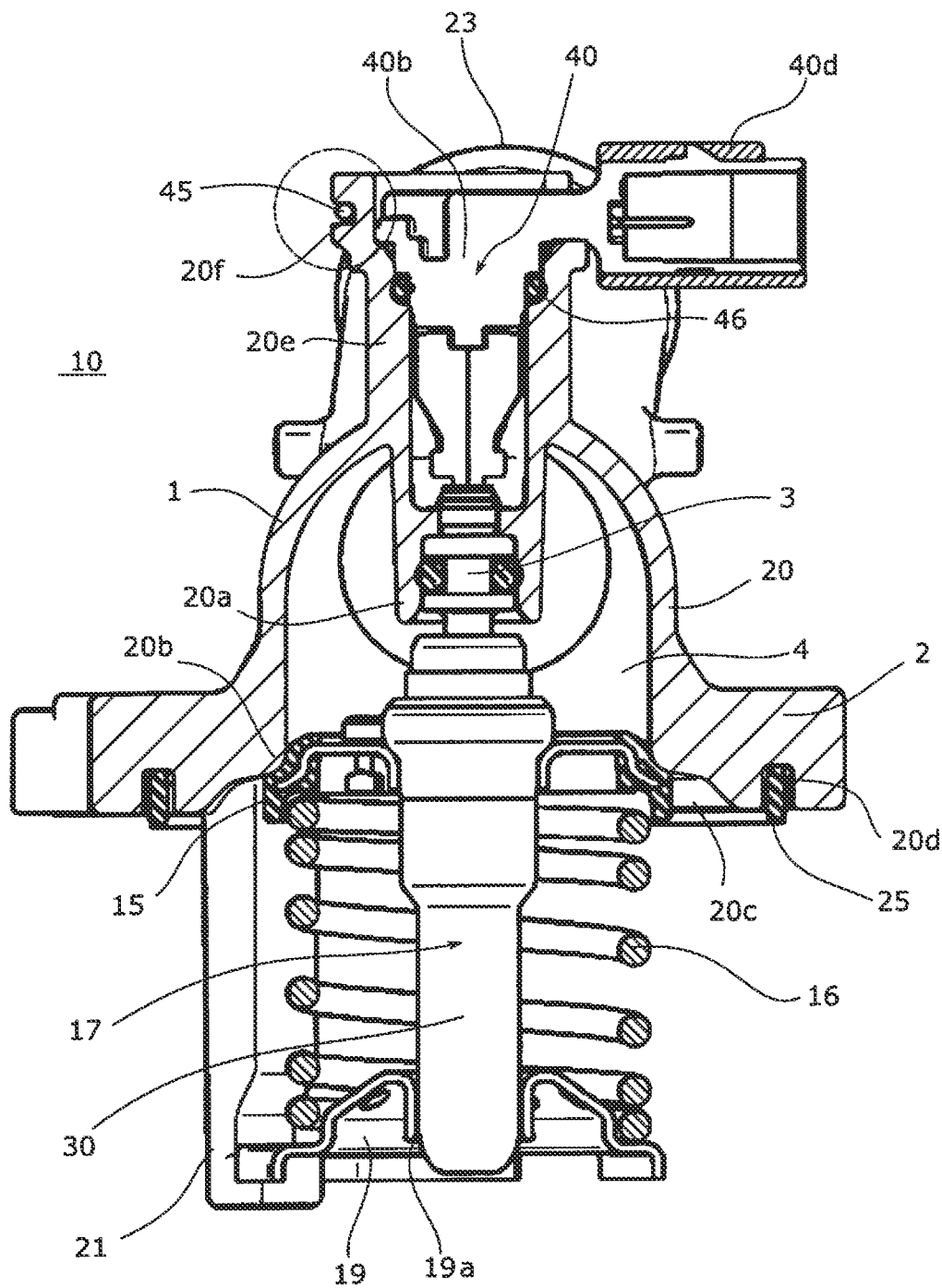
FIG. 3 is an A-A cross-sectional view of the thermostat device in FIG. 2.
Figure 4:
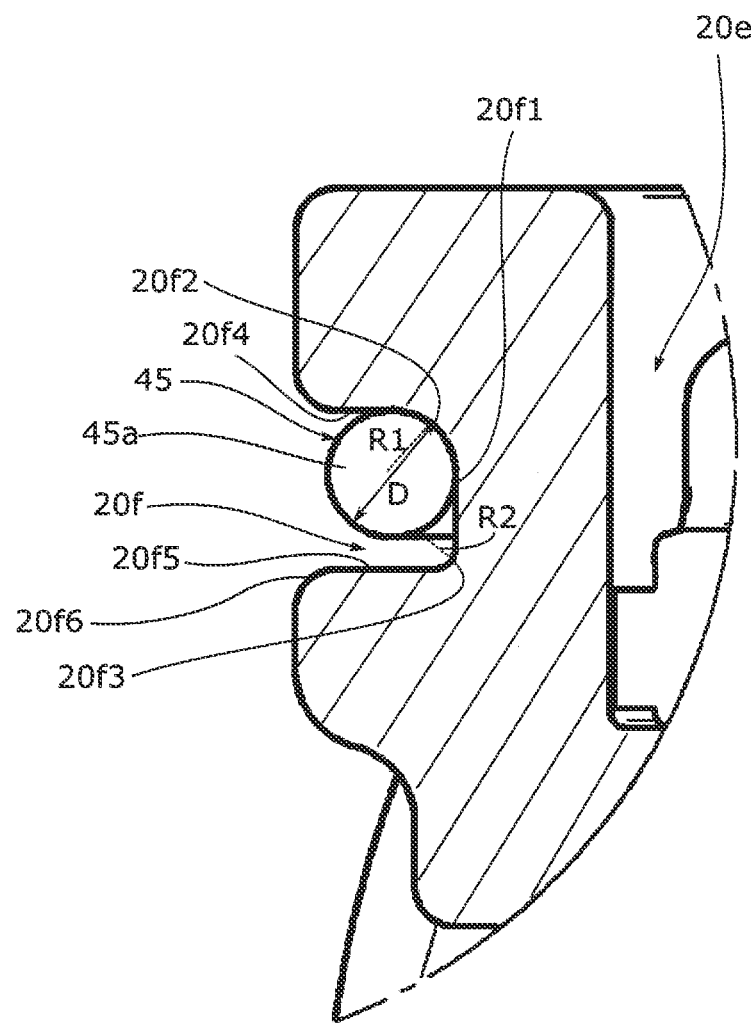
FIG. 4 is a partially enlarged cross-sectional view of the thermostat device in FIG. 3.

FIG. 1 is a perspective view of a thermostat device as a temperature adjustment device according to a first embodiment, and FIG. 2 is a plan view of the thermostat device in FIG. 1. FIG. 3 is an A-A cross-sectional view of the thermostat device in FIG. 2, and FIG. 4 is a partially enlarged cross-sectional view (a portion enclosed by a broken circle) of the thermostat device in FIG. 3. Further, FIG. 5 is a B-B cross-sectional view of the thermostat device in FIG. 2, and FIG. 6 is a partially enlarged cross-sectional view of the thermostat device in FIG. 5.

Figure 5:
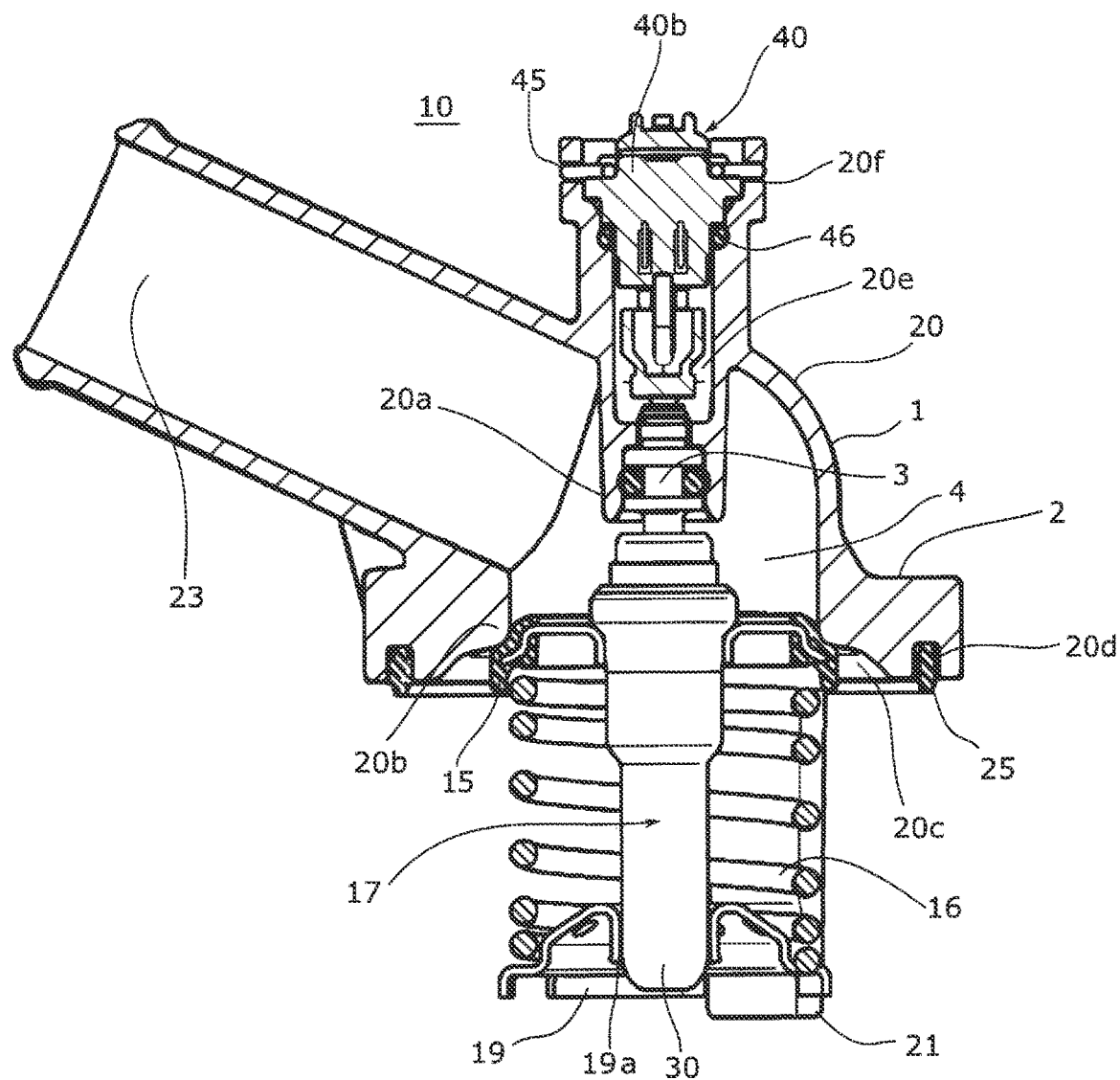
FIG. 5 is a B-B cross-sectional view of the thermostat device in FIG. 2.
Figure 6:
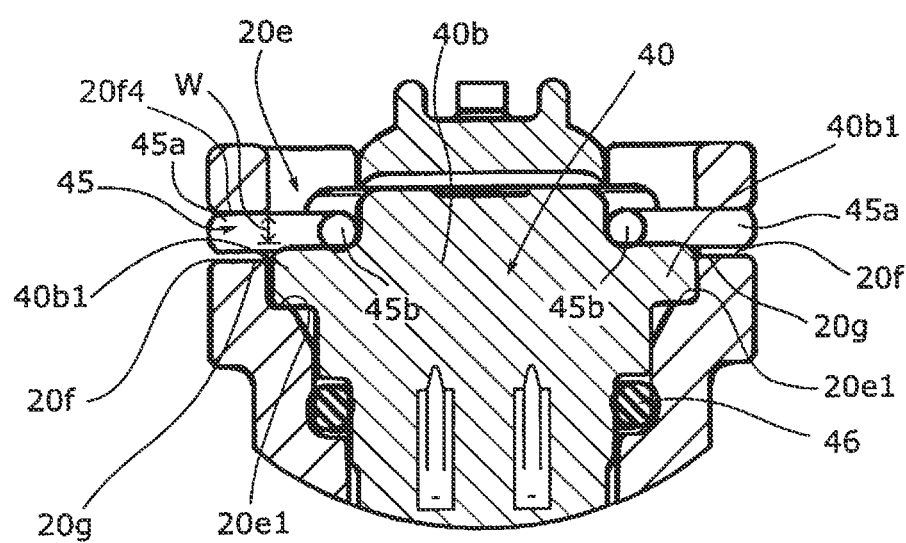
FIG. 6 is a partially enlarged cross-sectional view of the thermostat device in FIG. 5.

As shown in FIG. 3 and FIG. 5, the thermostat device 10 is provided with a housing 1, a flow passage 4 of coolant formed in the housing 1, a valve body 15 that opens and closes the flow passage 4, a thermo-element 17 that drives to open and close the valve body 15 by extending and retracting depending on the coolant temperature, a coil spring 16 as a biasing member that biases the valve body 15 to the closing direction, a frame 19 that supports one end of the coil spring 16, a heater 40 as a temperature adjustment member, and a clip member 45 that fixes the heater 40 to the housing 1. For the convenience of the description below, the upper and lower portions of the thermostat device 10 shown in FIG. 3 are simply referred to as "the upper" and "the lower".

In the first embodiment, the housing 1 is made of synthetic resin. The housing 1 includes a body 20 having an approximately capped cylinder shape at the lower end of which an opening 20c, a pair of flanges 2, 2 outwardly protruding from the lower end outer periphery of the body 20, a pair of legs 21, 21 extending, facing to each other, downward from the lower opening edge of the body 20, a connecting port 23 of the radiator side extending obliquely upward from the top part of the body 20, and a sleeve 20e standing upward from the top part of the body 20, to which a heater is fixed.

The coolant is to pass through the connecting port 23, inside of the body 20, and the opening 20c, which altogether constitute the flow passage 4 in the housing 1.

As shown in FIG. 2, bolt holes 2a are formed on each of the pair of flanges 2, 2. Metal tubes are press-fitted in the bolt holes 2a, and bolts (not shown) for fixing the thermostat device 10 to the counterpart member are inserted through the tube thereof. As shown in FIG. 3, an annular groove 20d is formed so as to surround the opening 20c on the edge of the lower end opening of the body 20, which is located inside of the bolt holes 2a, and a gasket 25 is attached to the groove 20d.

The gasket 25 seals between the thermostat device 10 and the counterpart member, and prevents the coolant flowing in the housing 1 from leaking outside in a state the thermostat device 10 is attached to the counterpart member. A region (space) inside (inner area of) the gasket 25 in the body 20 is denoted as the inside of the housing 1. The counterpart members denote, for example, a water pump, a water jacket of the engine, or a member for attaching the thermostat device thereto.

An annular valve seat 20b is formed on the inner periphery just above the edge of the lower-end opening of the body 20 located inside the housing 1; the flow passage 4 is opened or closed by the valve body 15 unseated from or seated on the valve seat 20b.

As shown in FIG. 3, the thermo-element 17 is inserted inside the housing 1. The thermo-element 17 is disposed at the axial center of the body 20 along the axis. The thermo-element 17 includes a temperature-sensitive case 30 incorporating a temperature-sensitive member such as wax whose volume changes depending on the temperature and a piston 3 whose upper end is supported by the housing 1 and exits and enters the temperature-sensitive case 30 depending on the volume change of the temperature-sensitive member.

When the temperature of the coolant around the temperature-sensitive case 30 rises and the temperature-sensitive member expands, the piston goes out from the temperature-sensitive member 30 and the thermo-element 17 extends. In contrast, when the temperature of the coolant around the temperature-sensitive case 30 drops and the temperature-sensitive member inside contracts, the piston 3 enters the temperature-sensitive member 30 and the thermo-element 17 retracts. Thus, the thermo-element 17 operates to extend and retract depending on the temperature.

The distal end of the piston 3 located at the upper end of the thermo-element 17 is fitted to a cylindrical boss portion 22a formed at the top portion inside the body 20; the movement of the piston 3 upward against the housing 1 is inhibited. Thus temperature-sensitive case 30 moves up and down by the operation of extension and retraction of the thermo-element 17 without changing the position of the piston 3 against the housing 1.

The valve body 15 is fixed on the outer periphery of the temperature-sensitive case 30. This causes the valve body 15 to move up and down with the temperature-sensitive case 30 along with the extension and retraction of the thermo-element 17. When the thermo-element extends and the valve body 15 moves downward, the valve body 15 is unseated from the valve seat 20b and the coolant can flow therebetween, the flow passage is allowed to be communicated. In contrast, when the thermo-element 17 contracts and the valve body 15 moves upward and is seated on the valve seat 20b, the communication of the flow passage 4 is closed. Thus, the valve 15 opens and closes the flow passage 4 by being unseated from or being seated on the valve seat 20b.

The upper end of the coil spring 16 abuts the backside of the valve body 15. The coil spring is disposed so as to surround the thermo-element 17. The lower end (one end) of the coil spring 16 is supported by the frame 19.

The frame 19 is hooked on the tip portion of the pair of the legs 21, 21 formed on the housing 1 and prevented from moving downward against the housing 1. A through-hole 19a is formed at the center of the frame 19. The temperature-sensitive case 30 is inserted movably vertically in the through-hole 19a. This means that the temperature-sensitive case 30 is movable vertically against the frame 19.

The coil spring 16 is a compressive spring and is placed between the valve body 15 and the frame 19 in a compressed state. The valve body 15 is biased upward (toward the valve seat 20b side). In this construction, when the coolant temperature around the thermo-element 17 rises high and the thermo-element 17 extends, the valve body 15 moves downward against the biasing force of the coil spring 16 and is unseated from the valve seat 20b. Meanwhile, when the coolant temperature around the thermo-element 17 is lowered and the thermo-element 17 retracts, the valve body 15 moves upward following the biasing force of the coil spring 16 and comes closer to the valve seat 20b.

Figure 7:
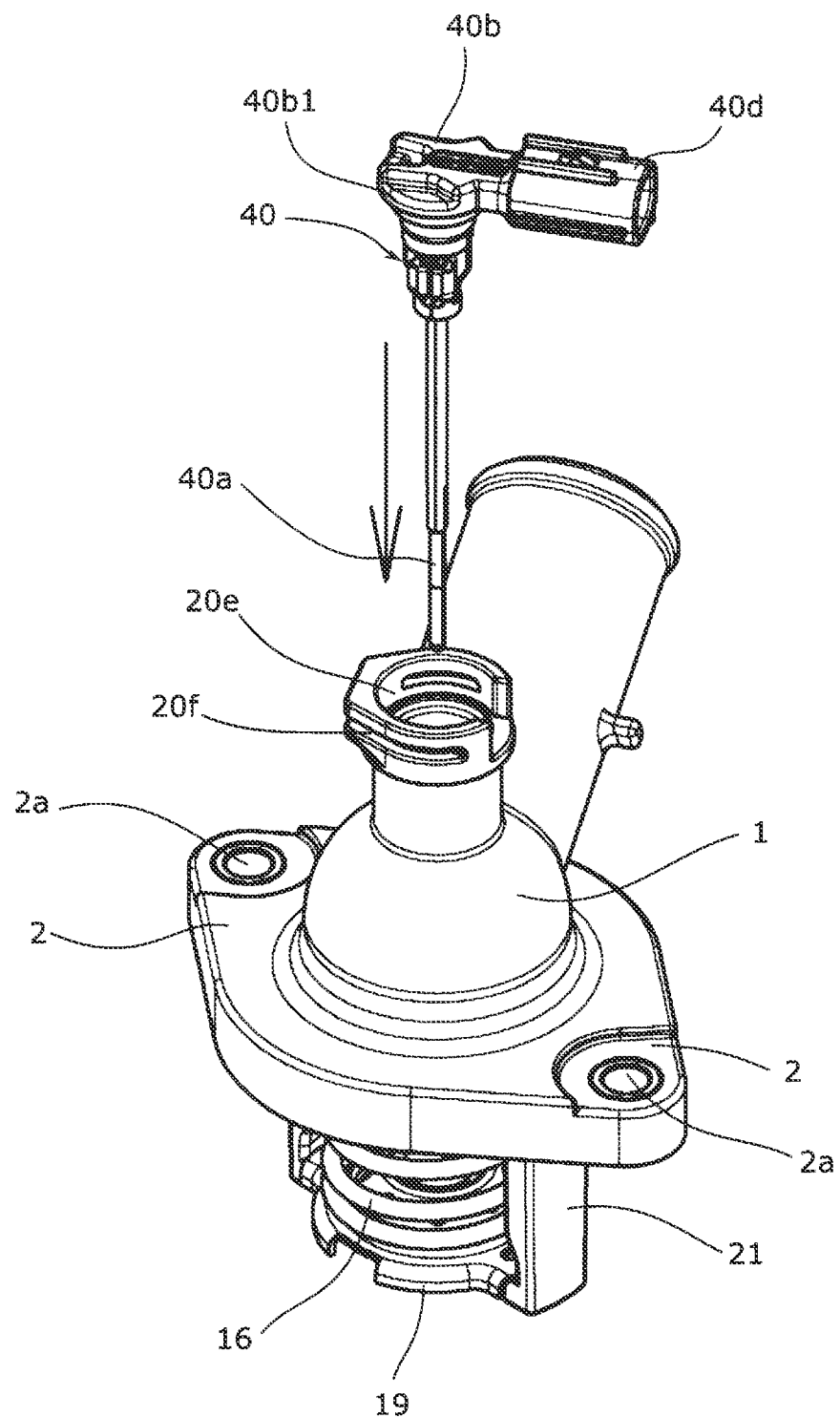
FIG. 7 is a perspective view illustrating an assembly procedure of the thermostat device according to the first embodiment.

In the case of the thermostat device 10, the valve body 15 can be actively operated to open and close by heating the temperature-sensitive member by energizing the heater 40. More in detail, as shown in FIG. 7, the heater 40 includes a heating section 40a in a bar-like shape that is inserted inside the piston 3, an attaching section 40b joined to one end of the heating section 40a and attached with a clip member to the sleeve 20e, and a connector 40d protruding sideward from the attaching section 40b. A cable for energizing is connected to the connector 40d and the connector 40 can be energized from a power source of the vehicle, for example. When the heater 40 is energized, the heating section 40a generates heat, whereby the temperature sensitive portion in the temperature sensitive case 30 expands by the heating through the piston 3, and the piston is pushed out from the temperature sensitive case 30 to open the valve 15.

A sleeve 20e disposed so as to stand up upward from the top of the body 20 on the axis of the body 20 of the housing 1. In the sleeve 20e, one end (a lower end) continuous to the body 20 is the proximal end of the sleeve 20e, and the opposite end (an upper end) to the proximal end is the distal end of the sleeve 20e.

On the outer periphery of the sleeve 20e, a groove 20f having an approximately U-shape in cross-section opening to the side direction (a direction perpendicular to the axis of the sleeve 20e) along the circumferential direction is formed. The inner diameter of the distal end of the sleeve 20e is greater than that right below. As shown in FIG. 6, a step 20e1 is formed to face the distal end on the inner periphery of the sleeve 20e. A lateral hole 20g penetrating toward the distal-end side farther than the step 20e1 from the inside of the groove 20f, in the sleeve 20e.

As shown in FIG. 6, a brim portion 40b1 projecting outward is formed at the attaching section 40b of the heater 40. When the heater 40 is put into the sleeve 20e from the heating section 40a side, as shown in FIG. 7, and as the attaching section 40b is inserted into the sleeve 20e, the entering of the heater 40 further into the housing 1 is blocked by abutting the brim portion 40b1 to the step 20e1. Below the brim portion 40b1 on the outer periphery of the attaching section 40b, a seal member 46 such as an O-ring is mounted, thereby preventing water or dust outside the thermostat device 10 from incoming into the housing 1.

Figure 8:
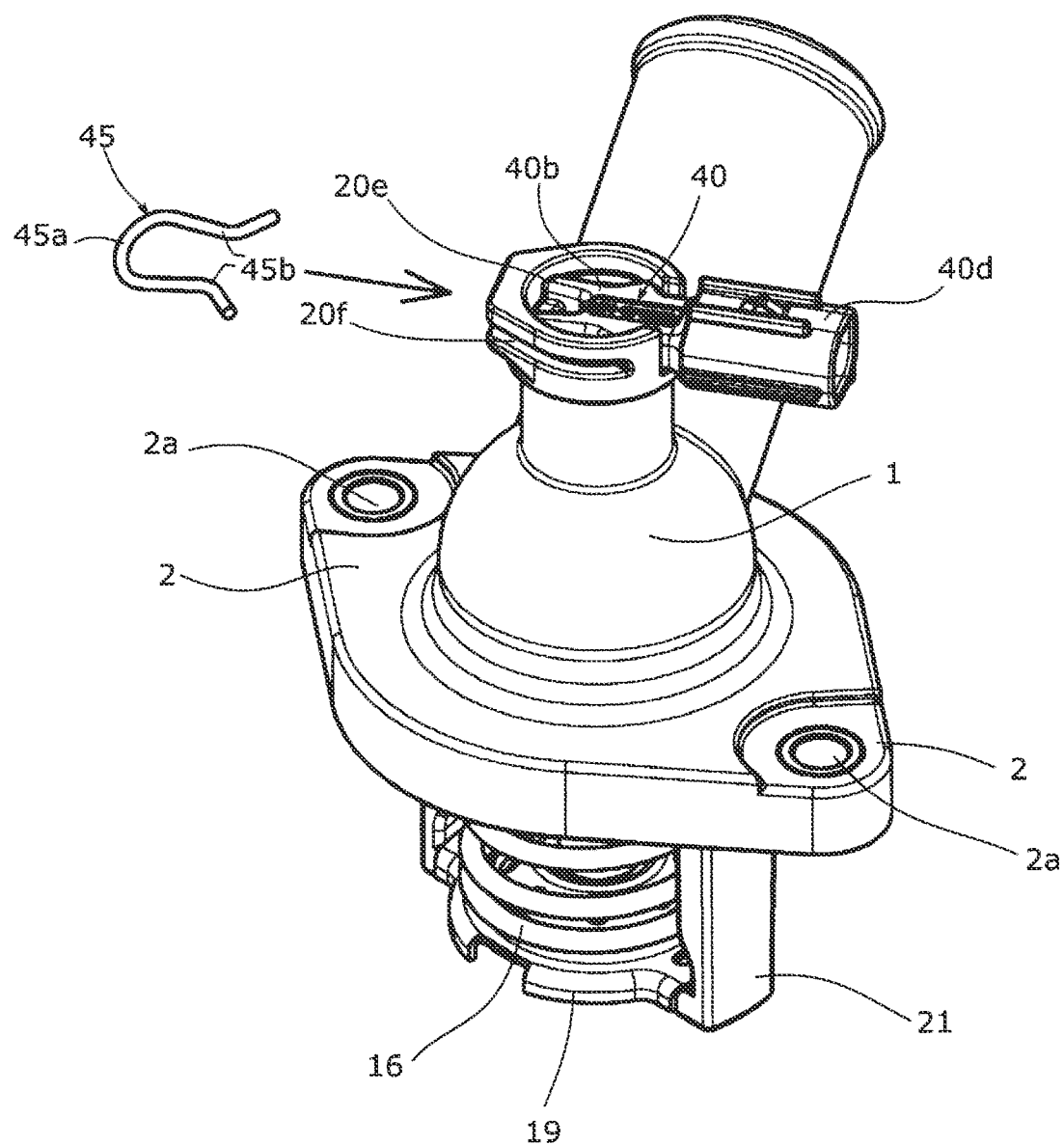
FIG. 8 is another perspective view illustrating the assembly procedure of the thermostat device according to the first embodiment.

As shown in FIG. 8, the clip member 45 for fastening the heater 40 to the sleeve 20e is made of a metal material such as stainless steel and includes an elastically deformable outer fitting portion 45a having a U-shape or C-shape in plan view and inward convex portions 45b extending from both ends of the outer fitting portion 45a facing each other. Further, as described above, when the clip member 45 is fitted to the sleeve 20e in a state where the brim portion 40b1 of the heater 40 is abutted to the inner circumferential step 20e1 of the sleeve 20e as shown in FIG. 8, the outer fitting portion 45a is fitted to the outer groove 20f of the sleeve 20e as shown in FIG. 6 and the inward convex portions 45b is inserted in the sleeve 20e through the lateral hole 20g to press the brim portion 40b1 from the upper side (the distal-end side of the sleeve 20e). With this, the heater 40 is prevented from coming off from the sleeve 20e and fixed to the sleeve 20e.

As shown in FIG. 4, an opening 20f6 of the groove 20f to which the outer fitting portion 45a of the clip member 45 is fitted is disposed to face outward at the side of the sleeve 20e, and the groove 20f opens sideward. The wall of the groove 20f is composed of a groove depth wall 20f1 which is located at the deep-most portion of the groove 20f at the opposite side of the opening 20f6 and a pair of opposing walls 20f4 and 20f5 extending from the distal-end side and the proximal-end side of the groove depth wall 20f1 toward the opening 20f6. The connecting portions of the opposing walls 20f4 and 20f5 connecting to the groove depth wall 20f1 are respectively curved to form a distal-end-side curved portion 20f2 and a proximal-end-side curved portion 20f3.

The distance W between the portion where the clip member 45 abuts the opposing wall 20f4 at the distal end and the portion where the clip member 45 abuts the brim portion 40b1 is slightly narrower than the diameter D of the wire material of the clip member 45 (W<D). Because of this, an upward force is applied to the opposing wall 20f4 at the distal end from the clip member side 45 and a downward force is applied to the brim portion 40b1 from the clip member side 45, and the clip member 45 is pressed to the step 20e1. Thus the heater 40 is fixed to the sleeve 20e without rattling.

Further, as shown in FIG. 4, the radius of curvature of the distal-end-side curved portion 20f2, the curved portion of the opposing wall 20f4 at the distal end, is different from that of the proximal-end-side curved portion 20f3, the curved portion of the opposing wall 20f5 at the proximal end. Specifically, the radius of curvature R1 of the distal-end-side curved portion 20f2 is greater than the radius of curvature R2 of the proximal-end-side curved portion 20f3 (R1>R2).

To inhibit opening the groove 20f due to the creep deformation, the stress is preferably reduced by increasing the radius of curvature of the curved portion that is continuous to the groove depth wall 20f1. The increase in both radii of curvature R1 and R2 of the distal-end-side curved portion 20f2 and the proximal-end-side curved portion 20f3, which are continuous to the groove depth wall 20f1, may widen the vertical width of the groove 20f and hinder the use of assembly equipment similar to the conventional one or increase the thermostat device in size due to the increase of the sleeve 20e.

In contrast to this, since radii of curvature R1 and R2 of the distal-end-side curved portion 20f2 and the proximal-end-side curved portion 20f3, which are continuous to the groove depth wall 20f1, are different in the thermostat device 10 of the first embodiment, the widening of the vertical width of the groove 20f is inhibited even if the radius of curvature R1 of the distal-end-side curved portion 20f2 is set greater. Thus, the assembly equipment similar to the conventional one can be used and prevents the thermostat device 10 (temperature adjustment device) from increasing in size due to the increase of the sleeve 20e.

Further, according to the above configuration, the stress is satisfactorily reduced by increasing the radius of curvature R1 of the distal-end-side curved portion 20f2, which is the curved portion of the opposing wall 20f4 located at the distal end side of the sleeve 20e that receives upward force from the clip member 45 side. Resultantly, even if the housing 1 is made of synthetic resin, the groove 20f can be inhibited from being deformed to be widened under the force from the clip member 45 side, and the rattling of the heater 40 (temperature adjustment member) can be suppressed.

Further, the outer fitting portion 45a of the clip member 45 is made of wire material in the thermostat device 10 of the first embodiment. The radius of curvature R1 of the distal-end-side curved portion 20f2 is less than or equal to the wire diameter D and greater than ½ of the wire diameter D (½D<R1≤D).

For the reduction of the stress, the radius of curvature R1 of the distal-end-side curved portion 20f2 is preferably increased. If the radius of curvature R1 of the distal-end-side curved portion 20f2 is increased without changing the vertical width of the groove 20f, the fitting portion 45a of the clip member 45 is hard to insert deeply in the groove 20f. Further, when the outer fitting portion 45a of the clip member 45 cannot be inserted deeply in the groove 20f, the clip member 45 becomes apt to come off by vibration and further disadvantageous to deformation due to the increase of the moment.

In contrast, according to the above configuration, when the housing 1 is made of an elastically deformable material such as polyamide 6T (polyhexamethylene terephthalamide), polyamide 9T (polynonamethylene terephthalamide), or elastomer-contained polyphenylene sulfide resin, the clip member 45 can be easily inserted into the groove 20f deeply while elastically deforming the housing 1, and the stress occurring at the distal-end side curved portion 20f2 can be reduced.

However, when the housing 1 is made of a hard-to-elastically-deform resin, such as polyphenylene sulfide resin without elastomer, the clip member 45 can be easily inserted into the groove 20f deeply, by setting the radius of curvature of the distal-end-side curved portion 20f2 less than or equal to ½ of the diameter D of the wire material (R1≤(½)D).

In the first embodiment, the temperature adjustment device is the thermostat device 10; the thermostat device 10 is provided with the flow passage 4 of the coolant formed in the housing 1, the valve body 15 that opens and closes the flow passage 4, the thermo-element 17 that operates to open or close the valve body 15 by the advancing and retracting depending on the coolant temperature, and the coil spring 17 (biasing member) biasing the valve body 15 to the valve-closed direction.

Further, the thermo-element 17 includes the temperature-sensitive case 30 incorporating a temperature-sensitive body whose volume changes in response to the temperature, the piston 3 whose one end is supported by the housing 1 and exits and enters the temperature-sensitive case 30 in response to the temperature. The temperature-adjusting device is the heater 40 which has the heating section 40a and the heating section 40a is inserted in the piston 3.

As described above, in a case where the temperature-adjusting device is the thermostat device 10, the temperature-adjusting member is the heater 40 having the heating section 40a, and the heating section 40a is inserted into the piston 3, the heater 40 needs to be firmly fixed to the housing 1 without rattling only by the clip member 45. It is because, for example, in the case where the temperature-adjusting member is a temperature sensor having a temperature sensing unit and the temperature sensing unit is disposed in the flow passage of the coolant, the temperature-adjusting member is biased to the exit direction under pressure in the flow passage and rattling might be reduced. In contrast, in the case where the heating section 40a is a heater 40 inserted into the piston 3, the heater is not biased by the pressure in the piston 3; the deformation of the groove 20f to be widened is directly connected to the occurrence of the rattling of the heater 40 (temperature-adjusting member). Because of the above reason, the application of the present invention to the thermostat device 10 having the above configuration is particularly effective.

Next, a thermostat device 10 of a second embodiment will be described. The thermostat device 10 of the second embodiment differs from the first embodiment in that the temperature adjustment member is a temperature sensor 41 equipped with a temperature sensing unit 41a; the basic structure of the thermostat device is the same as in the first embodiment. Thus, the same parts and portions that are identical or correspond to those in the first embodiment, and the same reference signs are used to omit detailed explanations.

Figure 9:
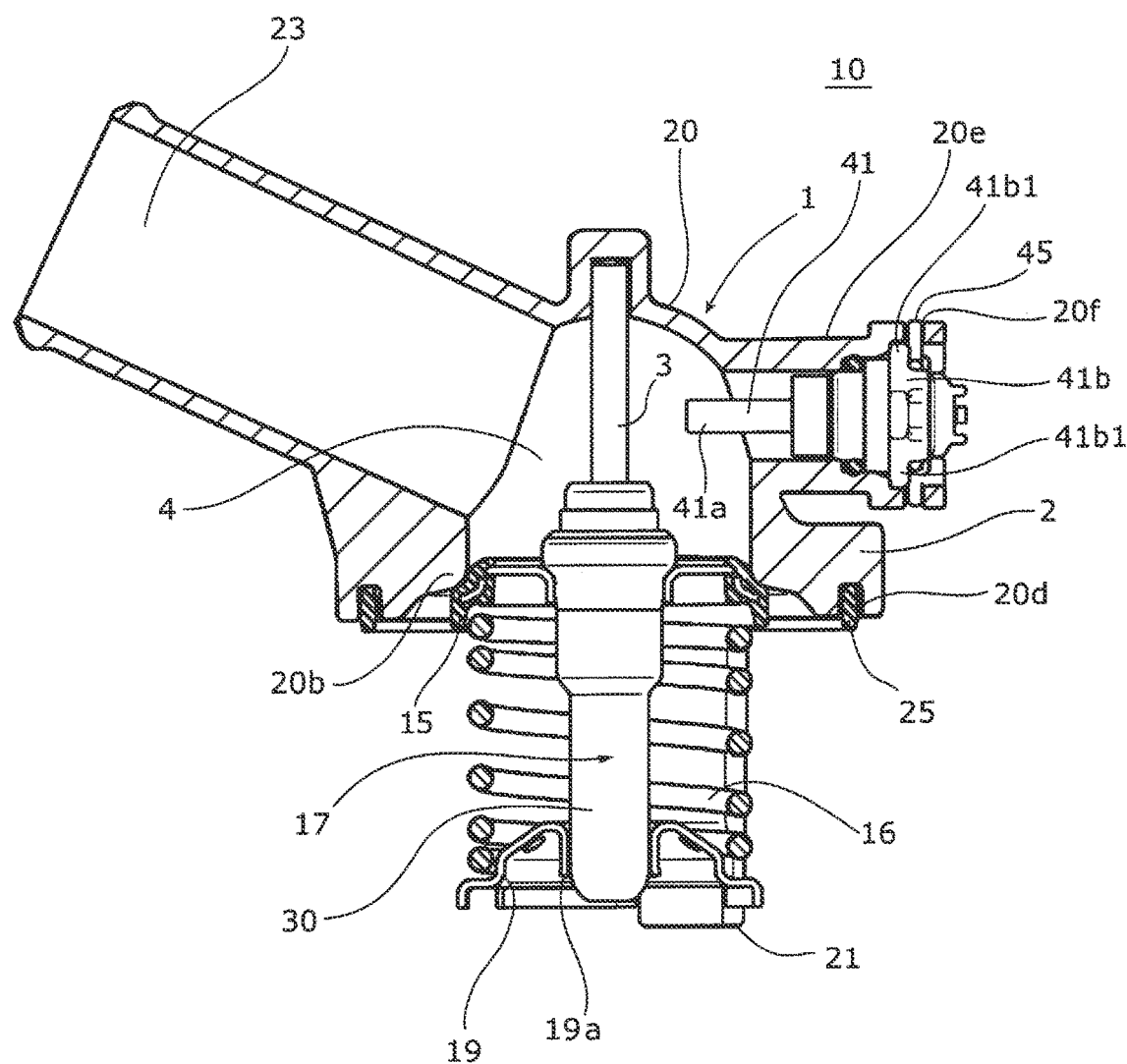
FIG. 9 is a cross-sectional view of the thermostat device as a temperature adjustment device according to a second embodiment.

As shown in a cross-sectional view in FIG. 9, in the thermostat device 10 of the second embodiment, the sleeve 20e is provided on the side of the body 20 of the housing 1, and the temperature sensor 41 is fixed to the sleeve 20e with a clip member 45. The temperature sensor 41 is provided with a bar-like temperature sensing unit 41a inserted in the flow passage 4, an attaching portion 41b equipped on one end of the temperature sensing unit 41a, and a connector (not shown) extending sideward from the fixing portion 41b. The attaching portion 41b is provided with a brim portion 41b1, similar to the attaching section 40b of the first embodiment, and the temperature sensor 41 is fixed to the sleeve 20e similar to the heater 40 of the first embodiment.

As described above, the temperature adjustment member may be a temperature sensor 41. Further, the sleeve 20b and the temperature adjustment member of the present invention may not be necessarily utilized in the thermostat device. For example, the sleeve 20e of the present invention may be attached to a conduit through which liquid or gas passes, and the temperature adjustment member may be fixed with the clip member 45.

Figure 10:
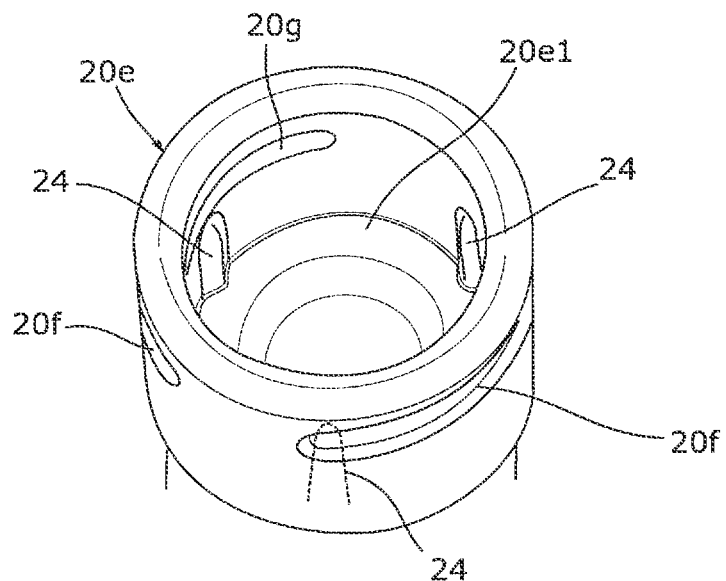
FIG. 10 is a perspective view showing the inner periphery of a sleeve applicable to the first and second embodiments.
Figure 11:
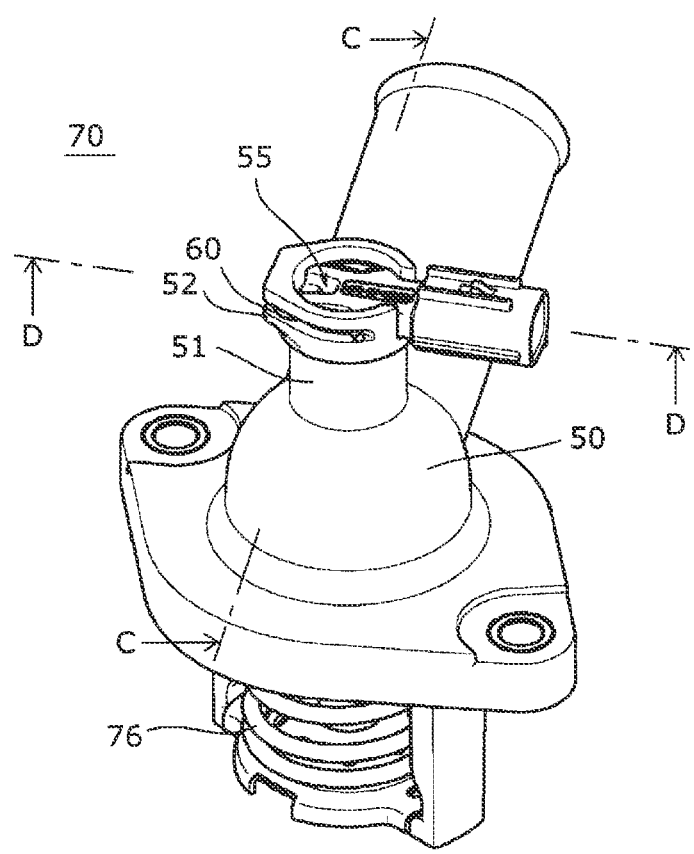
FIG. 11 is a perspective view of a conventional thermostat device.
Figure 12:
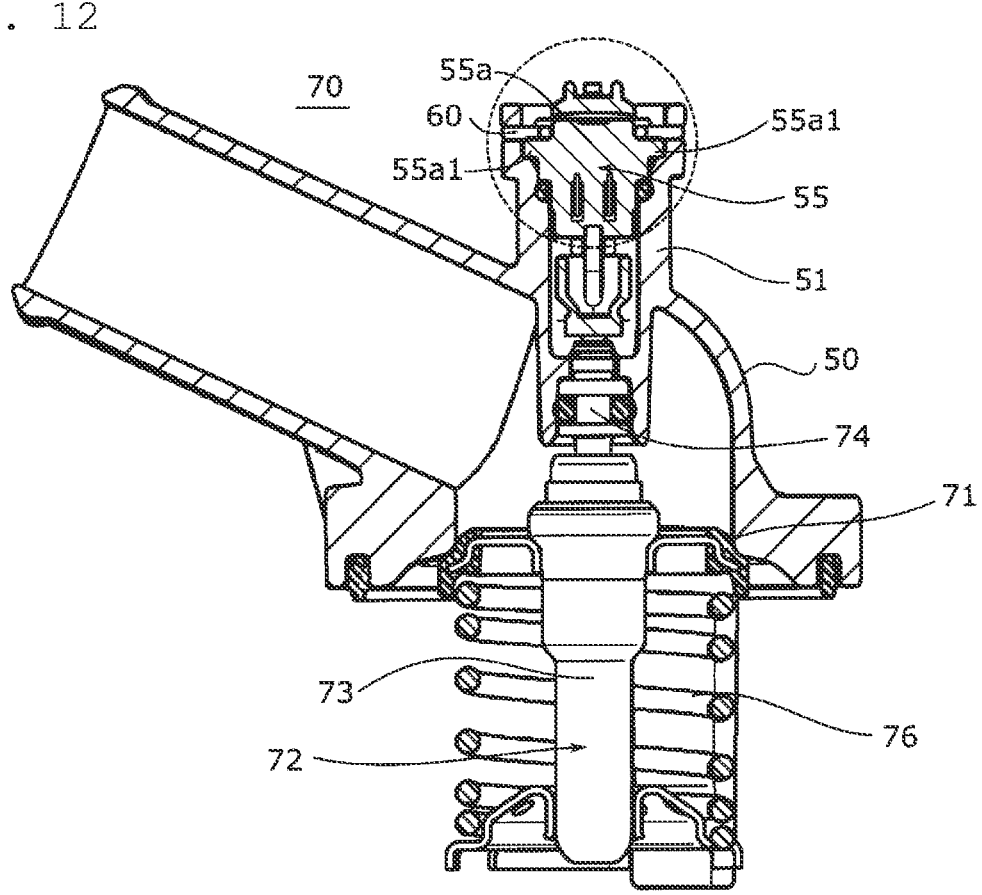
FIG. 12 is a C-C cross-sectional view of the thermostat device in FIG. 11.
Figure 13:
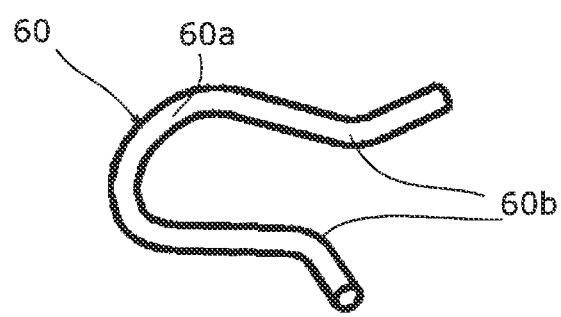
FIG. 13 is a perspective view of a clip member.
Figure 14:
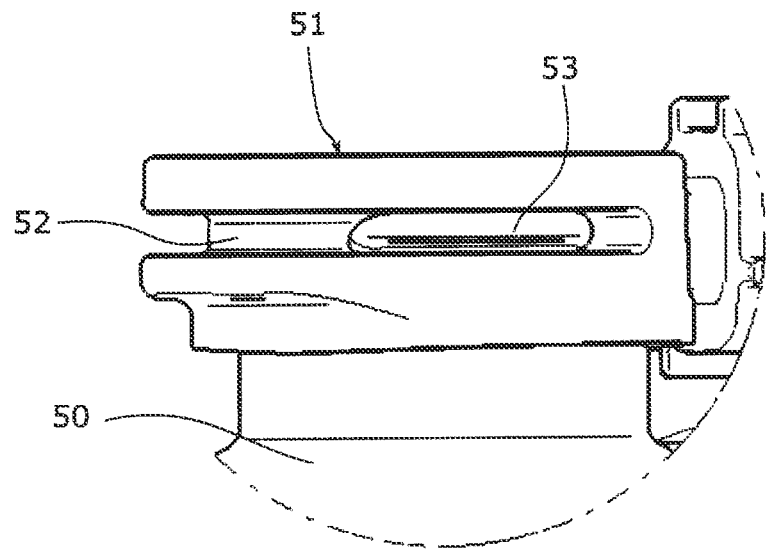
FIG. 14 is a side view showing a partially enlarged portion of the thermostat device in FIG. 11.
Figure 15:
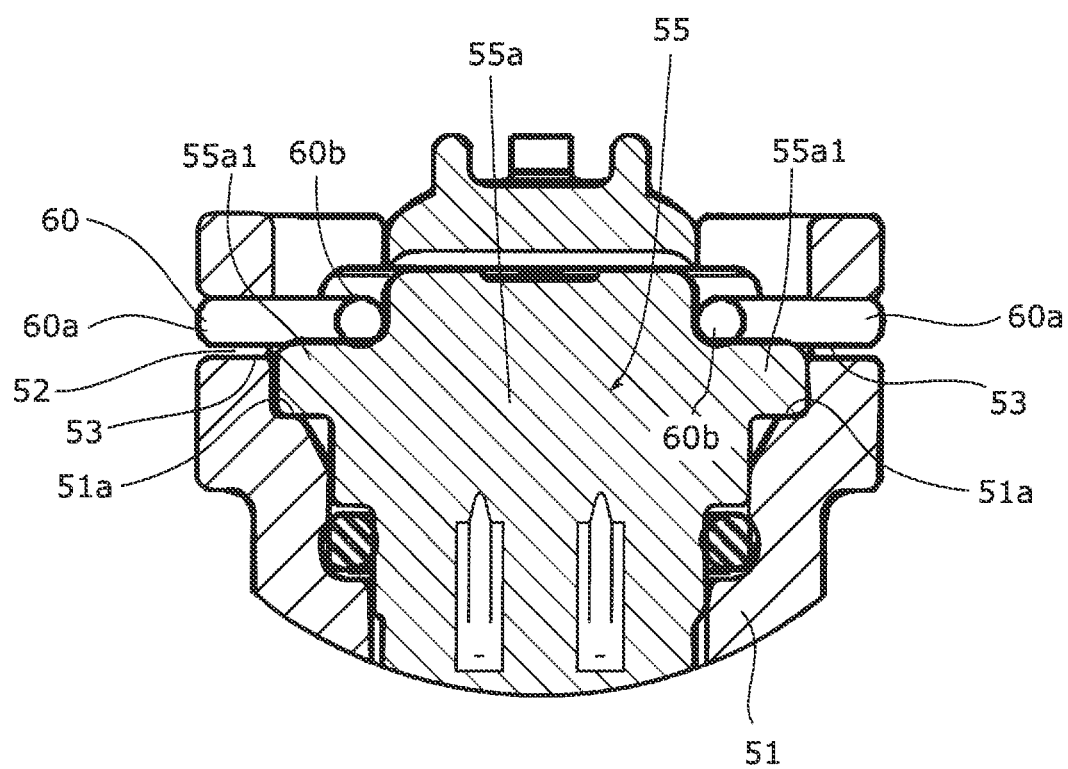
FIG. 15 is a partially enlarged cross-sectional view of FIG. 12.
Figure 16:
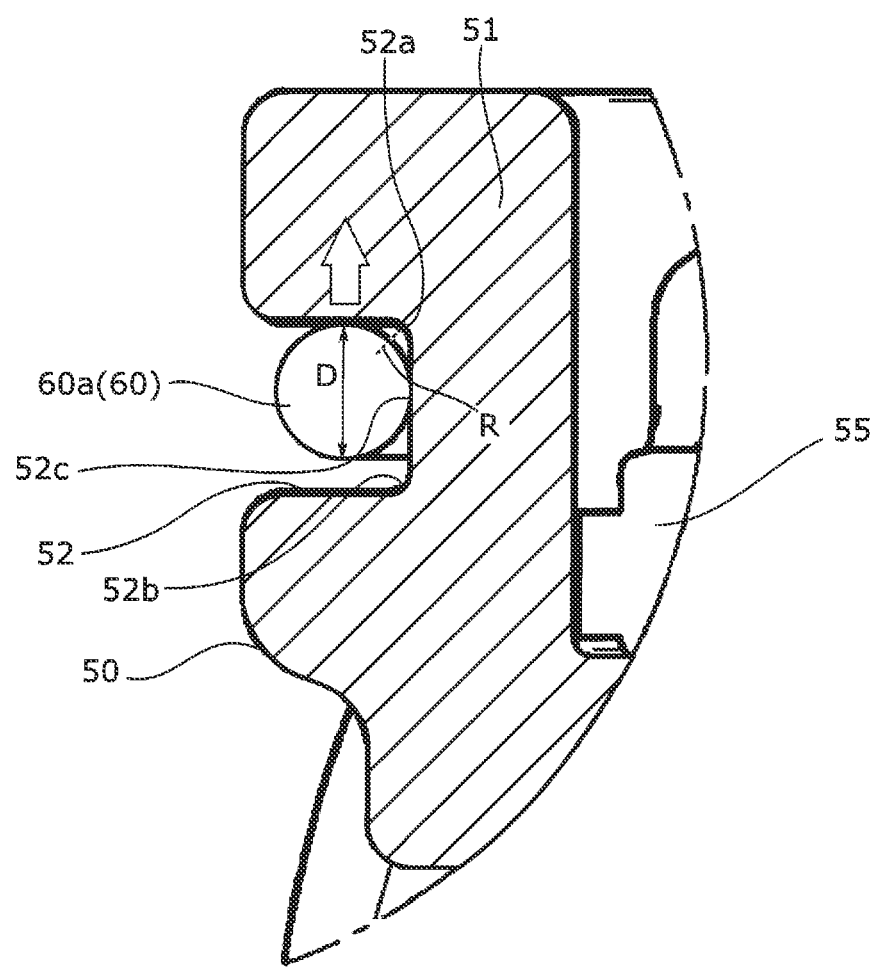
FIG. 16 is a partially enlarged cross-sectional view of a D-D cross-section of the thermostat device in FIG. 11.

Further, as shown in FIG. 10, multiple ribs 24 may be provided at different positions on the circumferential surface in the circumferential direction of the sleeve 20e, and the temperature adjustment members such as the heater 40 or temperature sensor 41 may be press-fitted to the sleeve 20e.

With this structure, the motion of the temperature adjustment member by an external force such as vibration can be inhibited, and the occurrence of rattling of the temperature adjustment member can be inhibited more reliably. Thus, the electrical connections are more reliably prevented from wearing out and causing contact failures.

Further, when the clip member 45 is attached, the temperature adjustment member is prevented from being moved by the clip member 45 in the direction of attachment (arrow direction in FIG. 8) and from being fixed at a position radially displaced from the center of the sleeve 20e. If the temperature adjustment member is decentered radially from the center of the sleeve 20e in that way, the sealing member 46 is compressed unevenly and the sealability of the sealing member 46 deteriorates (the compression increases at a portion of the circumferential direction of the sealing member 46 and the compression decreases at the opposite side.) For this reason, the temperature adjustment member is press-fitted to ribs 24 formed on the inner circumferential surface of the sleeve 20e, thereby capable of preventing the decentering of the temperature adjustment member and the deterioration of the sealability of the sealing member 46.

As in the first embodiment in particular, when the temperature adjustment member is firmly fixed to the housing 1 with the clip member 45, the possibility of decentering the temperature adjustment member increases when the clip member 45 is attached. Because of this, press-fitting the temperature adjustment member into the sleeve 20e is particularly effective, by providing ribs 24.

Further, by press-fitting the temperature adjustment member by providing the ribs 24, the temperature adjustment member is fixed in the radial direction and prevented from rotating in the circumferential direction in the sleeve 20e. This allows fixing the connector 40d in a certain direction, reducing the mounting space in the vehicles, and making it easy to connect to cables, for example.

When the temperature adjustment member is press-fitted into the sleeve 20e, the rib 24 can be eliminated to press-fit the entire periphery of the temperature adjustment member. However, it is preferable to press-fit the sleeve with ribs 24 to reduce the press-fit load on the housing 1 side, to reduce the load during assembly, and to avoid weld lines. The ribs 24 shown in FIG. 10 are long in length (vertically long), are disposed so as to extend along the axial direction of the sleeve 20e, and project toward the center (inward radially) from the inner periphery of the sleeve 20e. The ribs 24 are provided on the inner periphery of the sleeve 20e in three equally spaced strips.

Further, the ribs 24 are provided along the direction of vibration; the direction of assembly of the temperature adjustment member is preferably aligned with the direction of vibration. If the depth of press-fitting is not deep enough, the number of ribs is preferably increased. The number of ribs 24 is preferably odd more than or equal to three to ensure the coaxial property, but appropriately changeable. The shape of the ribs 24 is not limited to a long-sized one and is appropriately changeable.

Further, the ribs 24 may be provided on the outer periphery of the temperature adjustment member, and even in that case, similar effects are available as in the case provided on the inner periphery of the sleeve 20e.

The above is a detailed description of the preferred embodiment of the invention. However, modifications, variations, and alterations are possible as long as they do not deviate from the scope of the claims.

REFERENCE SIGNS LIST

1 Housing
2 flange 3 piston
10 thermostat device
15 valve body
16 coil spring (biasing member)
19 frame
19b engaging portion
20 body
20a boss
20b valve seat
20e sleeve
20f groove
20f1 groove depth wall
20f2 distal-end-side curved portion
20f2 proximal-end-side curved portion
20g lateral hole
21 leg
24 rib
40 heater (temperature adjustment member)
40b attaching section
41 temperature sensor (temperature adjustment member)
clip member
45a outer fitting portion
45b inward convex portion
D wire diameter
R radius of curvature

The invention claimed is:

1. A temperature adjustment device, comprising:
a housing having a cylindrical sleeve;
a temperature adjustment member having a heating section or a temperature sensing unit that is inserted from the sleeve into the housing; and
a clip member that fixes the temperature adjustment member to the sleeve,
wherein
a brim portion protruding outward is formed on the temperature adjustment member, the sleeve is provided with a groove formed on the outer periphery along the circumferential direction and a lateral hole whose one end is opened in the groove and that penetrates the thickness of the sleeve,
wherein
the clip member includes an outer fitting portion elastically deformable and fittable to the groove and inward convex portions extending facing to each other from both ends of the outer fitting portion and pressing the brim portion from a distal end side of the sleeve by being inserted through the lateral hole,
the wall of the groove includes a groove-depth wall located at the deep-most portion of the groove opposite to the opening of the groove, a distal-end-side curved portion continuous to the distal-end side of the sleeve of the groove-depth wall, and a proximal-end-side curved portion continuous to the proximal-end-side of the sleeve of the groove-depth wall,
the radius of curvature of the distal-end-side curved portion is greater than the radius of curvature of the proximal-end-side curved portion, and
the outer fitting portion of the clip member is made of wire material and the value of the radius of curvature of the distal-end-side curved portion is equal to or less than the diameter of the wire material and more than a value of ½ of the wire diameter.

2. The temperature adjustment device recited in claim 1, further comprising:
a flow passage of coolant formed in the housing;
a valve body that opens and closes the flow passage;
a thermo-element that drives to open and close the valve body by extending and retracting depending on the coolant temperature; and
a biasing member that biases the valve body to the closing direction,
wherein
the thermo-element includes a temperature-sensitive case incorporating a temperature-sensitive member whose volume changes depending on the temperature and a piston whose one end is supported by the housing and extends and retracts to the temperature-sensitive case depending on the volume change of the temperature-sensitive member, and the temperature adjustment member includes a heating section, and the heating section is inserted in the piston.

3. The temperature adjustment device recited in claim 1, wherein
the temperature adjustment member is a temperature sensor that has the temperature sensing unit.

4. A temperature adjustment device, comprising:
a housing having a cylindrical sleeve;
a temperature adjustment member having a heating section or a temperature sensing unit that is inserted from the sleeve into the housing; and
a clip member that fixes the temperature adjustment member to the sleeve,
wherein
a brim portion protruding outward is formed on the temperature adjustment member, the sleeve is provided with a groove formed on the outer periphery along the circumferential direction and a lateral hole whose one end is opened in the groove and that penetrates the thickness of the sleeve,
wherein
the clip member includes an outer fitting portion elastically deformable and fittable to the groove and inward convex portions extending facing to each other from both ends of the outer fitting portion and pressing the brim portion from a distal end side of the sleeve by being inserted through the lateral hole,
the wall of the groove includes a groove-depth wall located at the deep-most portion of the groove opposite to the opening of the groove, a distal-end-side curved portion continuous to the distal-end side of the sleeve of the groove-depth wall, and a proximal-end-side curved portion continuous to the proximal-end-side of the sleeve of the groove-depth wall,
the radius of curvature of the distal-end-side curved portion is greater than the radius of curvature of the proximal-end-side curved portion, and
the outer fitting portion is made of wire material and the value of the radius of curvature of the distal-end-side curved portion is equal to or less than ½ of the wire diameter.

5. The temperature adjustment device recited in claim 4, further comprising:
a flow passage of coolant formed in the housing;
a valve body that opens and closes the flow passage;
a thermo-element that drives to open and close the valve body by extending and retracting depending on the coolant temperature; and
a biasing member that biases the valve body to the closing direction,
wherein
the thermo-element includes a temperature-sensitive case incorporating a temperature-sensitive member whose volume changes depending on the temperature and a piston whose one end is supported by the housing and extends and retracts to the temperature-sensitive case depending on the volume change of the temperature-sensitive member, and the temperature adjustment member includes a heating section, and the heating section is inserted in the piston.

6. The temperature adjustment device recited in claim 4, wherein
the temperature adjustment member is a temperature sensor that has the temperature sensing unit.

7. A temperature adjustment device, comprising:
a housing having a cylindrical sleeve;
a temperature adjustment member having a heating section or a temperature sensing unit that is inserted from the sleeve into the housing; and
a clip member that fixes the temperature adjustment member to the sleeve,
wherein
a brim portion protruding outward is formed on the temperature adjustment member, the sleeve is provided with a groove formed on the outer periphery along the circumferential direction and a lateral hole whose one end is opened in the groove and that penetrates the thickness of the sleeve,
wherein
the clip member includes an outer fitting portion elastically deformable and fittable to the groove and inward convex portions extending facing to each other from both ends of the outer fitting portion and pressing the brim portion from a distal end side of the sleeve by being inserted through the lateral hole,
the wall of the groove includes a groove-depth wall located at the deep-most portion of the groove opposite to the opening of the groove, a distal-end-side curved portion continuous to the distal-end side of the sleeve of the groove-depth wall, and a proximal-end-side curved portion continuous to the proximal-end-side of the sleeve of the groove-depth wall,
the radius of curvature of the distal-end-side curved portion is greater than the radius of curvature of the proximal-end-side curved portion, and
ribs protruding inward radially are provided at different positions in the circumferential direction at the inner periphery of the sleeve or the outer periphery of the temperature adjustment member, and the temperature adjustment member is press-fitted into the sleeve.

8. The temperature adjustment device recited in claim 7, further comprising:
a flow passage of coolant formed in the housing;
a valve body that opens and closes the flow passage;
a thermo-element that drives to open and close the valve body by extending and retracting depending on the coolant temperature; and
a biasing member that biases the valve body to the closing direction,
wherein
the thermo-element includes a temperature-sensitive case incorporating a temperature-sensitive member whose volume changes depending on the temperature and a piston whose one end is supported by the housing and extends and retracts to the temperature-sensitive case depending on the volume change of the temperature-sensitive member, and the temperature adjustment member includes a heating section, and the heating section is inserted in the piston.

9. The temperature adjustment device recited in claim 7, wherein
the temperature adjustment member is a temperature sensor that has the temperature sensing unit.

\* \* \* \* \*